(12) United States Patent
Arad et al.

(10) Patent No.: US 10,764,410 B2
(45) Date of Patent: Sep. 1, 2020

(54) METHOD AND APPARATUS FOR PROCESSING PACKETS IN A NETWORK DEVICE

(71) Applicant: Marvell Israel (M.I.S.L) Ltd., Yokneam (IL)

(72) Inventors: Carmi Arad, Nofit (IL); Ilan Mayer-Wolf, Tel-Aviv (IL); Rami Zemach, Givat Shapira (IL); David Melman, Tel Aviv (IL); Ilan Yerushalmi, Hod Hasharon (IL); Tal Mizrahi, Haifa (IL); Lior Valency, Ganey Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 16/694,504

(22) Filed: Nov. 25, 2019

(65) Prior Publication Data

US 2020/0106866 A1 Apr. 2, 2020

Related U.S. Application Data

(63) Continuation of application No. 15/598,041, filed on May 17, 2017, now Pat. No. 10,491,718.

(60) Provisional application No. 62/338,340, filed on May 18, 2016.

(51) Int. Cl.
*H04L 29/06* (2006.01)
*H04L 12/937* (2013.01)

(52) U.S. Cl.
CPC ............ *H04L 69/22* (2013.01); *H04L 49/253* (2013.01); *H04L 69/12* (2013.01); *H04L 69/161* (2013.01)

(58) Field of Classification Search
CPC ....... H04L 69/22; H04L 49/253; H04L 69/12; H04L 69/161
See application file for complete search history.

(56) References Cited

U.S. PATENT DOCUMENTS

| | | | |
|---|---|---|---|
| 7,801,161 | B2 | 9/2010 | Levy et al. |
| 8,250,399 | B1 | 8/2012 | Mizrahi et al. |
| 8,553,582 | B1 | 10/2013 | Mizrahi et al. |
| 8,565,234 | B1 | 10/2013 | Mizrahi et al. |
| 8,611,352 | B2 | 12/2013 | Mizrahi et al. |
| 9,191,315 | B1 | 11/2015 | Mizrahi et al. |
| 10,491,718 | B2 | 11/2019 | Arad et al. |

(Continued)

OTHER PUBLICATIONS

International Search Report and Written Opinion of PCT/IB2017/052906 dated Aug. 14, 2017 (17 pages).

(Continued)

*Primary Examiner* — Melvin C Marcelo

(57) ABSTRACT

A packet received by a network device via a network. A first portion of the packet is stored in a packet memory, the first portion including at least a payload of the packet. The packet is processed based on information from a header of the packet. After the packet is processed, a second portion of the packet is stored in the packet memory, the second portion including at least a portion of the header of the packet. When the packet is to be transmitted the first portion of the packet and the second portion of the packet are retrieved from the packet memory, and the first portion and the second portion are combined to generate a transmit packet. The transmit packet is forwarded to a port of the network device for transmission of the transmit packet via port of the network device.

20 Claims, 5 Drawing Sheets

(56) References Cited

U.S. PATENT DOCUMENTS

2006/0268913 A1 11/2006 Singh et al.
2008/0240103 A1 10/2008 Schmidt
2011/0268119 A1 11/2011 Pong et al.
2014/0286351 A1 9/2014 Turgeman et al.
2017/0339074 A1 11/2017 Melman et al.

OTHER PUBLICATIONS

International Preliminary Report on Patentability in International Patent Application No. PCT/IB2017/052906, dated Nov. 29, 2018 (11 pages).

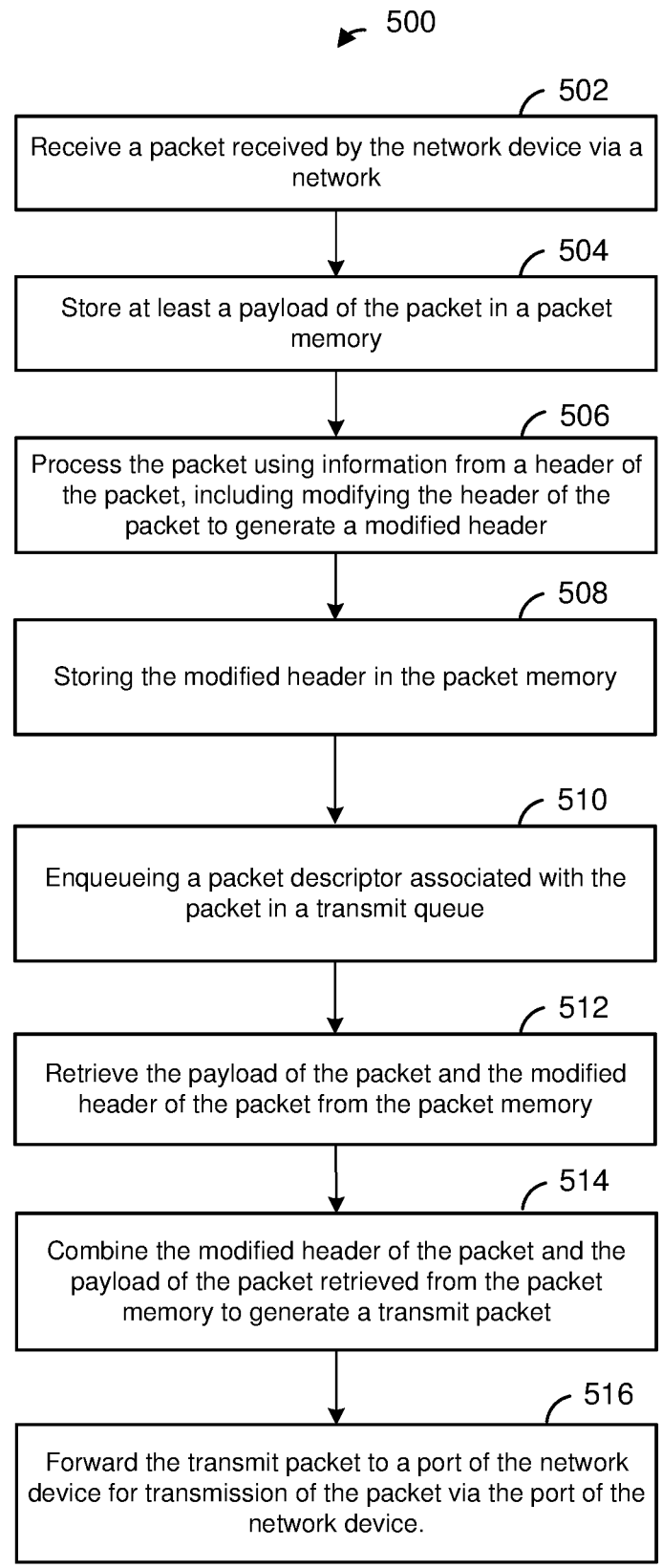

METHOD AND APPARATUS FOR PROCESSING PACKETS IN A NETWORK DEVICE

CROSS-REFERENCES TO RELATED APPLICATIONS

This disclosure is a continuation of U.S. patent application Ser. No. 15/598,041, now U.S. Pat. No. 10,491,718, entitled "Method and Apparatus for Processing Packets in a Network Device," filed on May 17, 2017, which claims the benefit of U.S. Provisional Patent Application No. 62/338,340, entitled "Method for Packet Processing in Switching Devices," filed on May 18, 2016. Both applications referenced above are incorporated by reference herein in their entireties.

FIELD OF TECHNOLOGY

The present disclosure relates generally to network devices such as network switches, bridges, routers, etc., and more particularly, to processing packets in network devices.

BACKGROUND

Network devices, such as bridges and routers, forward packets through a network based on addresses in the packets. A network device typically includes a plurality of ports coupled to different network links. The network device typically receives a packet via one port and processes address information in a header of the packet to decide via which other port or ports the network device should transmit the packet. The network device then forwards the packet to the determined one or more other ports. In various network devices, when a packet is received by a network device, the entire packet is stored in a packet memory. The packet is processed, using information from a header of the packet, at least to determine the port or ports to which to forward the packet. The packet is then enqueued in one or more transmit queues corresponding to the determined port or ports. Subsequently, when the packet is scheduled for transmission, the packet is retrieved from the packet memory for forwarding to the determined port or ports. After the packet is retrieved from the packet memory, header alteration is performed, if needed, to modify the header of the packet. The packet is then forwarded to the determined port or ports for transmission of the packet from the network device.

Because header alteration is performed after the packet is retrieved from the packet memory for transmission of the packet, a packet descriptor that includes information needed for header information is typically placed in a transmit queue, and then the information is used to perform header alteration when the packet descriptor is dequeued from the transmit queue and the associated packet is retrieved from the packet memory for transmission of the packet.

SUMMARY

In an embodiment, a method for processing packets in a network device includes receiving, at a receive processor of the network device, a packet received by the network device via a network. The method also includes storing, with the receive processor in a packet memory, a first portion of the packet, the first portion including at least a payload of the packet. The method further includes processing, with a packet processor of the network device, the packet based on information from a header of the packet. The method additionally includes after processing the packet, storing, with the packet processor in the packet memory, a second portion of the packet, the second portion including at least a portion of the header of the packet. The method further still includes, when the packet is to be transmitted, retrieving, with a transmit processor of the network device from the packet memory, the first portion of the packet and the second portion of the packet, and combining, with the transmit processor, the first portion of the packet and the second portion of the packet retrieved from the packet memory to generate a transmit packet. The method also includes forwarding, with the transmit processor, the transmit packet to a port of the network device for transmission of the transmit packet via port of the network device.

In another embodiment, a network device comprises a receive processor configured to receive a packet that was received via a network link and store, in a packet memory, a first portion of the packet, the first portion including at least a payload of the packet. The network device also comprises a packet processor configured to process the packet based on information from a header of the packet, and, after processing the packet, store, in the packet memory, a second portion of the packet, the second portion including at least a portion of the header of the packet. The network device additionally comprises a transmit processor configured to, when the packet is to be transmitted, retrieving, with a transmit processor of the network device from the packet memory, the first portion of the packet and the second portion of the packet, combine the first portion of the packet and the second portion of the packet retrieved from the memory to generate a transmit packet, and forward the transmit packet to a port of the network device for transmission of the transmit packet via the port of the network device.

BRIEF DESCRIPTION OF THE DRAWINGS

FIG. 5 is a flow diagram of another example method for processing packets in a network device, according to an embodiment.

DETAILED DESCRIPTION

Figure 1:
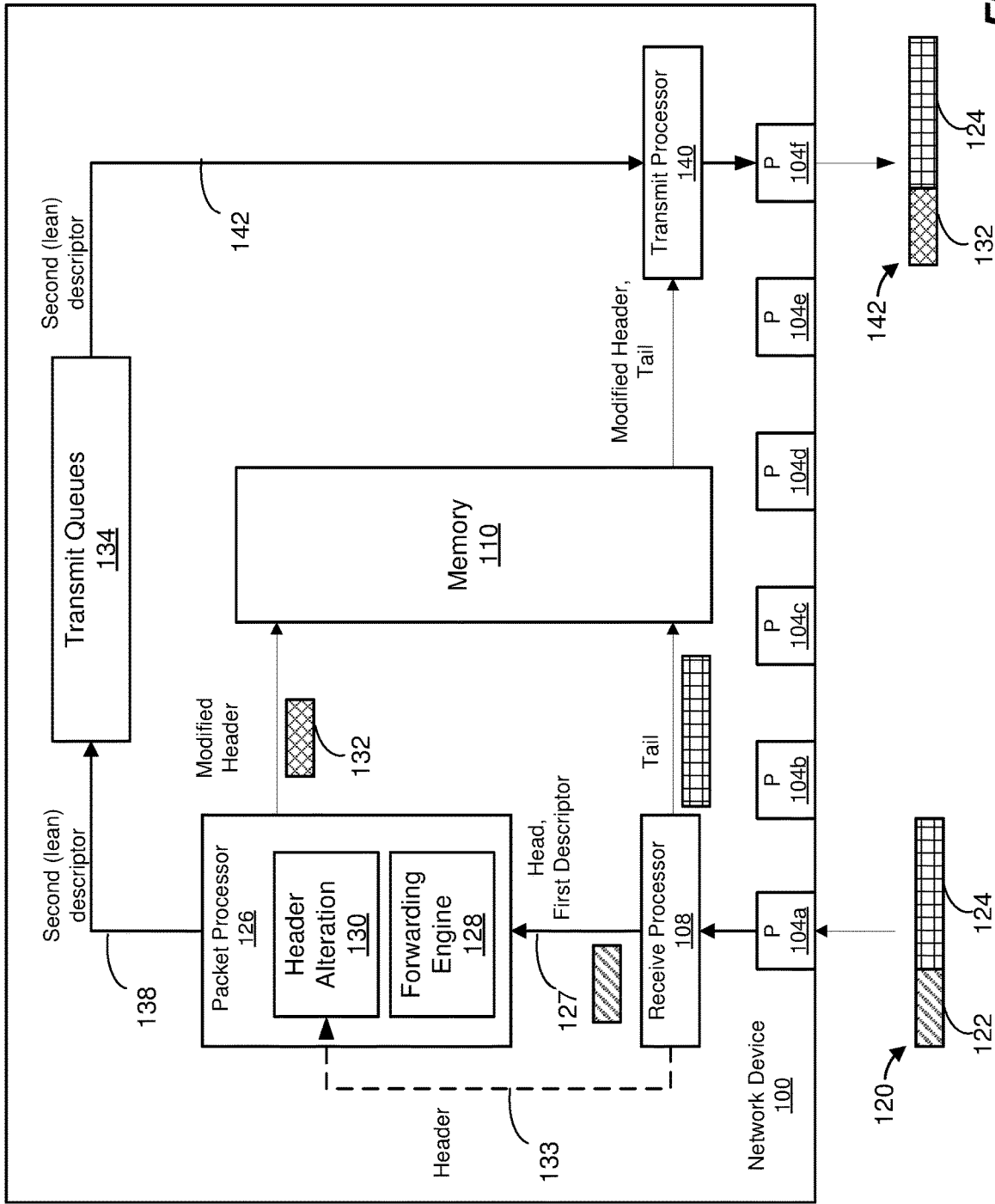
FIG. 1 is a block diagram of an example network device, according to an embodiment.

In various embodiments described herein, when a network device receives a packet, the network device stores, in a packet memory, a first portion of the packet. The first portion of the packet includes a tail portion of the packet, in an embodiment. For example, the first portion of the packet includes at least a payload of the packet, in an embodiment. The network device then processes the packet based on information from a second portion of the packet. The second portion of the packet includes a head portion of the packet, in an embodiment. For example, the head portion of the packet includes at least a portion of a header of the packet, in an embodiment. The second portion of the packet is not initially stored in the packet memory with the first portion of the packet, in an embodiment. After performing at least a portion of processing of the packet, the network device stores the second portion of the packet in the packet memory. Then, when the packet is to be transmitted from the network device, the network device retrieves the first portion of the packet and the second portion of the packet from the packet memory and generates a transmit packet that includes the first portion and the second portion retrieved from the packet memory. The transmit packet is then transmitted from the network device, in an embodiment.

In various embodiments, storing the second portion of the packet in the packet memory after processing of the packet is performed by the network device allows for more efficient and/or more flexible processing of the packet as compared to conventional systems in which an entire packet is initially stored in a packet memory and the entire packet is subsequently retrieved from the packet memory for transmission from the network device. For example, in an embodiment, prior to storing the second portion of the packet in the packet memory, the network device modifies the second portion of the packet (e.g., modifies the header included in the second portion of the packet) based on a processing result for the packet. The network device then enqueues the packet in a transmit queue for subsequent transmission of the packet from the network device. Because the modified second portion (e.g., the modified header) is stored in the packet memory prior to being enqueued in the transmit queue, the network device need not store information needed for modifying the header in the transmit queue, in an embodiment. Accordingly, in an embodiment, to enqueue the packet in the transmit queue, the network device places less information in the transmit queue as compared to conventional systems in which the entire packet is initially stored in the packet memory, and header modification is performed when the entire packet is retrieved from the packet. For example, to enqueue the packet in the transmit queue the network device places, in the transmit queue, a "lean" packet descriptor that includes information needed to retrieve the packet from the packet memory, such as one or more indicators of memory location(s) in which portions of the packet are stored in the packet memory, and omits at least some information that was needed for header modification, such as processing results needed for header modification, in an embodiment. Storing less information in transmit queues reduces amount of memory needed for transmit queues in a network device, reduces power consumption of the network device, reduces the width of a communication bus needed for transferring information to transmit queues, etc., in at least some embodiments.

FIG. 1 is a block diagram of an example network device 100 that implements efficient processing and/or queueing techniques described herein, according to an embodiment. The network device 100 includes a plurality of ports 104 communicatively coupled to a plurality of network links (not shown). Although six ports 104 are illustrated in FIG. 1, the network device 100 includes any suitable number of ports 104 in various embodiments. In an embodiment, a packet received by the network device via a port 104 is provided to a receive processor 108 coupled to the port 104. Although only one receive processor 108 is shown in FIG. 1, and the one receive processor 108 is shown as being coupled to only one port 104, the network device 100 includes multiple receive processors 108 and each of the multiple processors 108 is coupled to respective one or multiple ports 104, in various embodiments.

The receive processor 108 is configured to store at least a first portion of a received packet in a packet memory 110. In an embodiment, the first portion of the packet includes a tail portion of the packet. For example, the first portion of the packet includes at least a payload of the packet, in an embodiment. The first portion of the packet excludes a second portion of the packet, in an embodiment. For example, the first portion of the packet excludes at least a portion of a header of the packet, in an embodiment. Accordingly, the at least the portion of the header of the packet is initially not stored in the packet memory 110, in this embodiment. The receive processor 108 stores the first portion of the packet at a first memory location in the packet memory 110, in an embodiment. In some embodiments, the receive processor 108 determines the first memory location in the packet memory 110 at which to store the first portion of the packet. In some embodiments, the receive processor 108 receives, from the packet memory 110 in response to a write request from the receive processor 108, an indicator (e.g., an address, a pointer, etc.) of the first memory location in the packet memory 110 at which the first portion of the packet is stored.

The network device 100 includes a packet processor 126, in an embodiment. Although only one packet processor 126 is shown in FIG. 1, the network device 100 includes multiple packet processors 126, in some embodiments. The receive processor 108 is configured to provide the second portion of the packet to the packet processor 126 for processing of the packet, in an embodiment. For example, the receive processor 108 is configured to provide the second portion of the packet to the packet processor 126 for processing of the packet, where the second portion of the packet includes at least a portion of a header of the packet, in an embodiment. In an embodiment, the receive processor 108 provides the at least the portion of the header of the packet to the packet processor 126 for example by placing the at least the portion of the header of the packet in a buffer (not shown) included in or coupled to the packet processor 126. Additionally, the receive processor 108 provides, to the packet processor 126, the indicator of the first memory location at which the first portion of the packet is stored in the packet memory 110, in an embodiment. For example, the receive processor 108 provides, to the packet processor 126, an address, a pointer, or another suitable indicator of the first memory location at which the first portion of the packet is stored in the packet memory 110. In an embodiment, a first packet descriptor associated with the packet is generated and provided to the packet processor 126 for processing of the packet. In an embodiment, the receive processor 108 is configured to generate the first packet descriptor associated with the packet. In other embodiments, another suitable device or module within the network device 100 is configured to generate the first packet descriptor associated with the packet. In an embodiment, the first packet descriptor contains information from the header of the packet that the packet processor 126 utilizes to process the packet. In some embodiments, the first packet descriptor associated with the packet includes the indicator of the first memory location at which the first portion of the packet is stored in the packet memory 110. In some embodiments, the first packet descriptor associated with the packet additionally includes one or more of (i) the second portion of the packet, (ii) at least the portion of the header of the packet and (iii) other information that the packet processor 126 utilizes for processing of the packet.

The first descriptor associated with the packet is provided to the packet processor 126 via a first communication bus 127 that couples the receive processor 108 to the packet processor 126, in an embodiment. Additionally, the receive processor 108 separately provides the second portion of the packet that includes the at least the portion of the header of the packet to the packet processor 126 so that the packet processor 126 can suitably modify the header of the packet, if needed, as will be described in more detail below, in an embodiment. For example, the receive processor 108 provides the second portion of the packet to the packet processor 126 via a communication path 133 between the receive processor 108 and the packet processor 126. In an embodiment, the second portion is stored in a buffer (not shown) in the packet processor 126 and is subsequently retrieved from the buffer for processing and/or modification by the packet processor 126. In some embodiments, the second portion of the packet is included in the first packet descriptor provided to the packet processor 126 via the communication bus 127. In some such embodiments, the receive processor 108 need not separately provide the second portion of the packet to the packet processor 126. Accordingly, the receive processor 108 the communication path 133 is omitted from the network device 100, in at least some such embodiments.

The packet processor 126 is configured to process the packet based on one or more of (i) the information from the header of the packet included in the first packet descriptor associated with the packet, (ii) the second portion of the packet and (iii) the at least the portion of the header of the packet provided to the packet processor 126, in an embodiment. In an embodiment, processing of the packet includes at least determining a port or ports 104 to which the packet is to be forwarded. For example, the packet processor 126 includes a forwarding engine 128 configured to determine, based on header information, one or more of the ports 104 to which the packet is to be forwarded. The forwarding engine 128 includes or is coupled to a forwarding database (not shown) that stores forwarding information (e.g., port information) associated with addresses (e.g., media access control (MAC) addresses, Internet Protocol (IP) addresses, etc.) and/or other suitable information, in an embodiment. In an embodiment, the forwarding engine 128 is configured to utilize header information to look up information in the forwarding database that indicates one or more ports 104 to which the packet is to be forwarded.

Processing of the packet additionally includes modifying the second portion (e.g., the at least the portion of the header of the packet) based on a processing result for the packet, in at least some situations, in an embodiment. In an embodiment, the packet processor 126 includes a header alteration engine 130 configured to modify the header of the packet based on a processing result for the packet, in at least some situations, in an embodiment. In some embodiments, the packet processor 126 determines whether to and/or how to modify the header of the packet, and the header alteration engine 130 performs header alteration, if needed, as determined by the packet processor 126. In some scenarios, the header alteration engine 130 modifies the header of the packet e.g., to change a next hop address, to add an encapsulating header, to remove an encapsulating header, etc. In an embodiment, the header alteration engine 130 receives the header provided to the packet processor 126 by the receive processor 108, and modifies the header based on results of processing performed by one or more processing engines that precede the header alteration engine 130, in an embodiment. In an embodiment, the header alteration engine 130 obtains the header from the receive processor 108 via the communication path 133. In an embodiment, the receive processor 108 stores the packet header in a header buffer (not shown), and the header alteration engine 130 retrieves the header from the header buffer.

After processing of the packet and, if necessary, modification of the header of the packet, is performed by the packet processor 126, the packet processor 126 stores the second portion of the packet in the packet memory 110, where the second portion of the packet includes the unmodified, or the modified, at least the portion of the header of the packet. In some embodiments, the packet processor 126 further processes the packet based on the modified header of the packet before storing the second portion of the packet in the packet memory 110. For example, the packet processor 108 performs egress classification of the packet, for example to determine an egress flow to which the packet belongs, applies egress access control list (ACL) rules to the packet, etc., in various embodiments.

In an embodiment, the packet processor 126 stores the second portion of the packet at a second memory location in the packet memory 110. In an embodiment, the second memory location is separate from and independent of the first memory location at which the first portion of the packet is stored in the packet memory 110. In another embodiment, the second memory location at which the second portion of the packet is stored depends on and/or is determined based on the first memory location at which the first portion of the packet is stored in the packet memory 110. In some embodiments, the packet processor 126 determines the second memory location in the packet memory 110 at which to store the second portion of the packet. In some embodiments, the packet processor 126 receives, from the packet memory 110 in response to a write request from the packet processor 126, an indicator (e.g., an address, a pointer, etc.) of the second memory location in the packet memory 110 at which the first portion of the packet is stored.

As discussed above, the packet processor 126 is configured to determine one or more ports 104 to which the packet is to be forwarded. After processing of the packet is performed by the packet processor 126, the packet processor 126 enqueues the packet in one or more transmit queues 134 for subsequent forwarding of the packet to the determined one or more ports 104, in an embodiment. The packet processor 126 is configured to enqueue the packet in the one or more transmit queues after the second portion of the packet is stored in the packet memory 110, in an embodiment. Because modification of the second portion (e.g., the at least the portion of the header of the packet), if necessary, is performed prior to the second portion of the packet being stored in the packet memory, it is not necessary to perform modification of the second portion when the packet is dequeued from the transmit queue and the packet is retrieved from the packet memory 110 for transmission of the packet. Thus, information needed for modifying the second portion (e.g., the at least the portion of the header of the packet) of the packet need to be retained when the packet is enqueued by the packet processor 126 in the one or more transmit queues 134.

In an embodiment, to enqueue the packet in a transmit queues 134, the packet processor 126 generates a second packet descriptor associated with the packet, and provides the second packet descriptor to the transmit queue 134. In an embodiment, in at least some scenarios, the packet processor 126 generates multiple copies of the second descriptor, and provides respective ones of the multiple copies of the second packet descriptor in respective ones of multiple transmit queues 134, for example for multicasting or broadcasting the packet via multiple ones of the ports 104. In an embodiment, the second packet descriptor includes only information needed retrieve the packet from the packet memory 110 and to properly forward the packet to the corresponding one or more portion 104. In an embodiment, the second packet descriptor includes memory location information that links the first portion of the packet and the second portion of the packet in the packet memory 110. For example, the indicator of the first memory location at which the first portion of the packet is stored in the packet memory 110, the indicator of the second memory location at which the second portion of the packet is stored in the packet memory 110 and indications of the one or more ports 104 to which the packet is to be forwarded, in an embodiment. The second packet descriptor additionally includes an indication of a quality of service (QoS) with which the packet is associated, in an embodiment. The second packet descriptor generally omits header information that was used to process the packet and/or omits some or all of the processing results that were used for modification of the second portion (e.g., header) of the packet, in an embodiment. Upon generating the second packet descriptor associated with the packet, the packet processor 126 discards the one or more of (i) the first packet descriptor associated with the packet, (ii) the second portion of the packet and (iii) the at least the portion of the header of the packet that were that were provided to the packet processor 126 for processing of the packet and/or that were used to process packet by the packet processor 126.

In an embodiment, the second packet descriptor associated with the packet includes less information than the amount of information that was provided to the packet processor 126 for processing of the packet. In an embodiment, the second packet descriptor associated with the packet is a "lean" packet descriptor that is smaller (e.g., includes a fewer number of bits) than the first packet descriptor that was provided to the packet processor 126 for processing of the packet. In an embodiment, the second packet descriptor associated with the packet is smaller (e.g., includes a fewer number of bits) than the first packet descriptor associated with the packet in combination with the second portion and/or at least the portion of the header of the packet that were provided to the packet processor 126 for processing of the packet. In an embodiment, the packet processor 126 provides the second packet descriptor associated with the packet to the one or more transmit queues 134 via a second communication bus 138 that couples the packet processor 126 to the transmit queues 134. In an embodiment, the second communication bus is narrower (e.g., includes less communication lines) than the first communication bus 127 that couples the receive processor 108 to the packet processor 126.

When the packet is scheduled to be forwarded to a port 104 for transmission via the port 104, the second packet descriptor associated with the packet is dequeued from the corresponding transmit queue 134 and is provided to a transmit processor 140 for subsequent transmission of the packet via a port 104. Although only one transmit processor 140 is shown in FIG. 1, and the one transmit processor 140 is shown as being coupled to only one port 104, the network device 100 includes multiple transmit processors 140 and each of the multiple transmit processors 140 is coupled to respective one or multiple ports 104, in various embodiments. The transmit processor 140 retrieves the packet from the packet memory 110 using the memory location information included in the second packet descriptor associated with the packet. In an embodiment, the transmit processor 140 retrieves the first portion of the packet from the first memory location in the packet memory 110 using indicator of the first memory location included in the second packet descriptor associated with the packet, and retrieves the second portion of the packet from the second memory location in the packet memory 110 using the indicator of the second memory location included in the second packet descriptor associated with the packet. In an embodiment, the transmit processor 140 generates a transmit packet that includes the first portion of the packet retrieved from first memory location in the packet memory 110 and the second portion of the packet retrieved from the second memory location on the packet memory 110. The transmit processor 140 forwards the transmit packet to the port 104, and the transmit packet is transmitted from the network device 100 via the port 104, in an embodiment.

In general, because a packet is enqueued in a queue 134 using an associated second packet descriptor that includes less information than an associated first packet descriptor that was provided to the packet 126 for processing of the packet, less memory is needed for the transmit queues 134 as compared to conventional systems in which the packet descriptor that was used to process the packet is enqueued in a transmit queue in at least some embodiments. Moreover, because less memory is needed for the transmit queues 134, less power is consumed by the memory that holds the queues 134, in an embodiment. Additionally, as discussed above, a narrower communication bus is used to couple the packet processor 126 to the transmit queues 134 as compared to conventional systems in which a greater amount of information needs to be provided to a transmit queue to enqueue a packet in the transmit queue. Similarly, a narrower communication bus is used to couple the transmit queues 134 to the transmit processor 140 as compared to conventional systems in which the greater amount of information is stored in the transmit queues, in at least some embodiments.

With continued reference to FIG. 1, in a more specific example embodiment illustrated in FIG. 1, the network device 100 receives a packet 120, for example, via a port 104a. The packet 120 includes a header 122 and a payload 124. In an embodiment, the header 120 corresponds to one or more layers of the protocol stack and, in some cases, identifies the corresponding packet as belonging to a particular connection-oriented or connectionless data stream. In some embodiments, the header 122 refers to all information that precedes the payload on the transport layer, i.e., layer four (L4) in the Open System Interconnection (OSI) seven-layer model. However, if desired, the header 122 includes all headers up to and including the application-layer header or, conversely, includes less than the headers of the layer two (L2), layer 3 (L3), and L4 of the OSI model, in various embodiments.

The receive processor 108 stores a first portion of the packet 120 at a first memory location in the packet memory 110. The first portion of the packet 120 that the receive processor 108 stores at the first memory location in the packet memory 110 includes the payload 124 of the packet 120 and omits the header 122 of the packet 120, in the illustrated embodiment. The receive processor 108 provides a second portion of the packet 120 to the packet processor 126. The second portion of the packet 120 that the receive processor 108 provides to the packet processor 126 includes the header 122 of the packet 120, in an embodiment. In an embodiment, the receive processor 108 generates a first packet descriptor associated with the packet, and provides the first packet descriptor to the packet processor 126. The first packet descriptor includes information that indicates the first memory location at which payload 124 is stored in the packet memory 110. Additionally, the first packet descriptor includes at least a portion of the header 122 of the packet 120, in an embodiment. For example, the first packet descriptor includes one or more fields from the header 122 that are needed for processing the packet 120, in an embodiment. In an embodiment, the first packet descriptor includes the entire second portion (e.g., the entire header 122) of the packet 120.

The packet processor 126 processes the packet 120 using header information from the header 122 of the packet 120 (e.g., header information included in the first packet descriptor). Processing of the packet 120 includes determining, by the forwarding engine 128 of the packet processor 126, port or ports 104 to which the packet 120 is to be forwarded, in an embodiment. For example, the forwarding engine 128 determines that the packet 120 is to be forwarded to the port 104f, in the illustrated embodiment. The forwarding engine 128 updates the first packet descriptor associated with the packet 120 to include in the first packet descriptor indication or indication of the determined port or ports to which the packet 120 is to be forwarded, in an embodiment.

Processing of the packet 120 additionally includes modifying the header 122 of the packet 120, in an embodiment. The packet processor 126 determines whether to and/or how to modify the header 122 based on processing header information and/or information included in the first packet descriptor associated with the packet 120, in an embodiment. In an embodiment, when the packet processor 126 determines that the header 122 is to be modified, the header alteration unit 130 modifies the header 122 to generate a modified header 132. As just some examples, the header alteration engine 130 modifies the header 122 to change a next hop address in a field of the header 122, to add an encapsulating header to the header 122, to remove an encapsulating header from the header 122, etc., in various embodiments.

Continuing with the example embodiment illustrated in FIG. 1, the packet processor 126 stores the modified header 132 in the packet memory 110. In an embodiment, the packet processor 126 stores the modified header 132 at a second memory location in the packet memory 110, the second memory location being separate from and independent of the first memory location at which the payload 124 of the packet 120 is stored in the packet memory 110. In another embodiment, the second memory location at which the modified header 132 is stored in the packet memory 110 depends on and/or is determined based on the first memory location at which the which the payload 124 of the packet 120 is stored in the packet memory 110. In some embodiments, prior to storing the modified header 132 in the packet memory 110, the packet processor 126 further processes the packet 120 using the modified header 132. For example, the packet processor 126 performs egress classification of the packet 120 based on the modified header 132, for example to determine an egress flow to which the packet 120 belongs, identifies one or more egress access control list (ACL) rules to be applied to the packet 120 based on the modified header 132, etc., in various embodiments.

The packet processor 126 enqueues the packet 120 in a transmit queue 134 corresponding to the port 104f to which the packet is to be forwarded, in an embodiment. To enqueue the packet 120 in a transmit queue 134 corresponding to the port 104f, the packet processor 126 generates a second packet descriptor associated with the packet 120, and stores the second packet descriptor in the transmit queue transmit queue 134 corresponding to the port 104f. The second packet descriptor includes memory location information that links the payload 124 and the modified packet header 132 stored in the packet memory 110. In an embodiment, the memory location information includes first information that indicates the first memory location at which the payload 124 is stored in the packet memory 110 and second information that indicates the second memory location at which the modified header 132 is stored in the packet memory 110. In some embodiments, the second packet descriptor includes additional information that may be needed for scheduling and transmission the packet. For example, the additional information included in the second packet descriptor includes information that indicates the port or ports to which the packet 120 is to be forwarded, information that indicates a quality of serves (QoS) associated with the packet 120, etc., in various embodiments. In an embodiment, the second packet descriptor is shorter (e.g., includes a fewer number of bits) than the first packet descriptor that was provided to the packet processor 126 for processing of the packet 120.

The packet processor 126 provides the second packet descriptor associated with the packet 120 to the appropriate transmit queue 134, corresponding to the port 104f, for example, to which the packet 120 is to be forwarded, via the bus 138. Subsequently, when the packet 120 is scheduled to be transmitted, the second packet descriptor is provided from the transmit queue 134 to the transmit processor 140. The transmit processor 140 receives the second packet descriptor and, using the memory location information included in the second packet descriptor, retrieves the payload 124 and the modified header 132 from the packet memory 110. In an embodiment, the transmit processor 140 utilizes the first information included in the second packet descriptor to retrieve the payload 124 from the first memory location in the packet memory 110 and utilizes the second information included in the second packet descriptor to retrieve the modified header 132 from the second memory location in the packet memory 110. The transmit processor 140 generates a transmit packet 142 to include the payload 124 and the modified header 132 retrieved from the packet memory 110. The transmit processor 140 forwards the transmit packet 142 to the port 104f, and the transmit packet 140 is transmitted from the network device 100 via the port 104f, in the illustrated embodiment.

Figure 2A:
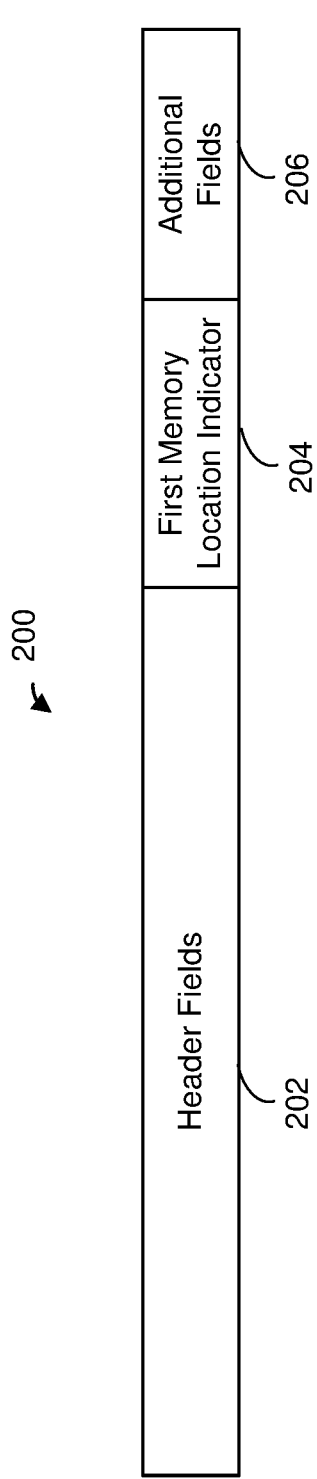
FIG. 2A is a block diagram of a first packet descriptor, associated with a packet, used to process a packet by the network device of FIG. 1, according to an embodiment.
Figure 2B:
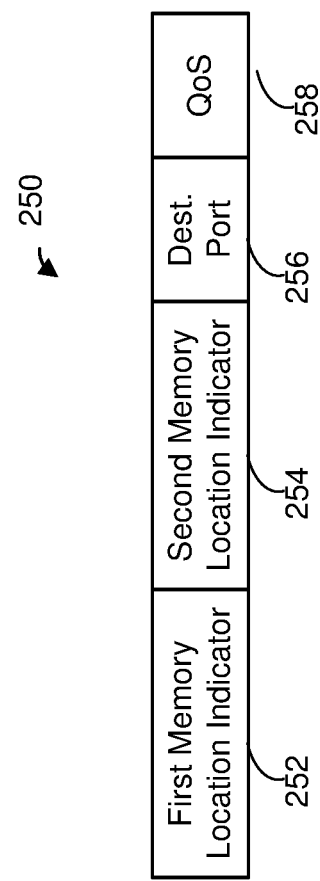
FIG. 2B is a block diagram of a second packet descriptor, associated with the packet, used to enqueue the packet in a transmit queue of the network device of FIG. 1, according to an embodiment.

FIGS. 2A and 2B are block diagrams that illustrate a first data structure provided to a packet processor for processing of a packet, and a second data structure placed in a transmit queue to enqueue the processed packet in the transmit queue for subsequent transmission of the packet, respectively, according to an embodiment. More specifically, FIGS. 2A and 2B are block diagrams, respectively, of a first packet descriptor 200, associated with a packet, provided to a packet processor for processing of the packet and a second packet descriptor 250, associated with the packet, placed in a transmit queue to enqueue the packet, according to an embodiment. Referring to FIG. 1, the first packet descriptor 200 corresponds to the first packet descriptor, associated with a packet, provided to the packet processor 126 for processing of the packet, and the second packet descriptor 250 corresponds to the second packet descriptor, associated with the packet, placed in a transmit queue 134 to enqueue the packet in the transmit queue 134, in an embodiment. For ease of explanation, the first packet descriptor 200 and the second packet descriptor 250 are described with reference to the network device 100 of FIG. 1. However, the first packet descriptor 200 and the second packet descriptor 250 are used with network devices different from the network device 100 of FIG. 1. Similarly, the network device 100 of FIG. 1 utilizes packet descriptors different from the first packet descriptor 200 and the second packet descriptor 250, in some embodiments.

Referring first to FIG. 2A, the first packet descriptor 200 is generated for a packet when a first portion (e.g., a payload) of the packet is stored in the packet memory 110, in an embodiment. The first packet descriptor 200 is the provided to the packet processor 126 for processing of the packet, in an embodiment. The first packet descriptor 200 includes a portion 202 that includes one or more fields from a header of the packet needed by the packet processor 126 for processing of the packet, in an embodiment. In an embodiment, the portion 202 includes an entire second portion of the packet that was initially not stored in the packet memory 110 at the time when the first portion of the packet was being stored in the packet memory 110. For example, the portion 202 includes the header of the packet, or a portion of the header of the packet, that was initially not stored in the packet memory 110 when a payload of the packet was being stored in the packet memory 110, in an embodiment. The first packet descriptor 200 additionally includes a field 204 that includes an indicator (e.g., an address, a pointer, etc.) of a first memory location at which the first portion of the packet is stored in the packet memory 110. In some embodiments, the first packet descriptor 200 further includes one or more additional fields 206. For example, the first packet descriptor 200 includes one or more additional fields 206 that are to be populated and/or updated by the packet processor 126 during processing of the packet.

Referring now to FIG. 2B, the second packet descriptor 250 is generated for the packet after the second portion of the packet is stored in the packet memory 100. The second packet descriptor 250 includes a field 252 that includes the indicator of the first memory location at which the first portion of the packet is stored in the packet memory 110. The second packet descriptor 250 additionally includes a field 254 that includes an indicator (e.g. an address, a pointer, etc.) of a second memory location at which the second portion of the packet is stored in the packet memory 110 after at least a portion of processing of the packet is performed by the packet processor 126. In some embodiments, the second packet descriptor 250 includes one or more additional fields, such as a field 256 that includes indicator or indicators of port or ports 104 to which the packet is to be forwarded and a field 258 that indicates a priority or a QoS with which the packet is associated. As seen in FIGS. 2A-2B, the second packet descriptor 250 is shorter than the first packet descriptor 200, in an embodiment. For example, the second packet descriptor 200 contains a fewer number of bits than a number of bits contained in the first packet descriptor 200, in an embodiment. The second packet descriptor omits the portion 202 included in the first packet descriptor 200, in an embodiment. Similarly, the second packet descriptor 250 omits the one or more additional fields 206 included in the first packet descriptor 200, in an embodiment. When the second packet descriptor 250 is generated for the packet, information in the first packet descriptor 200 is no longer needed, and the first packet descriptor 200 is discarded, in an embodiment.

Figure 3:
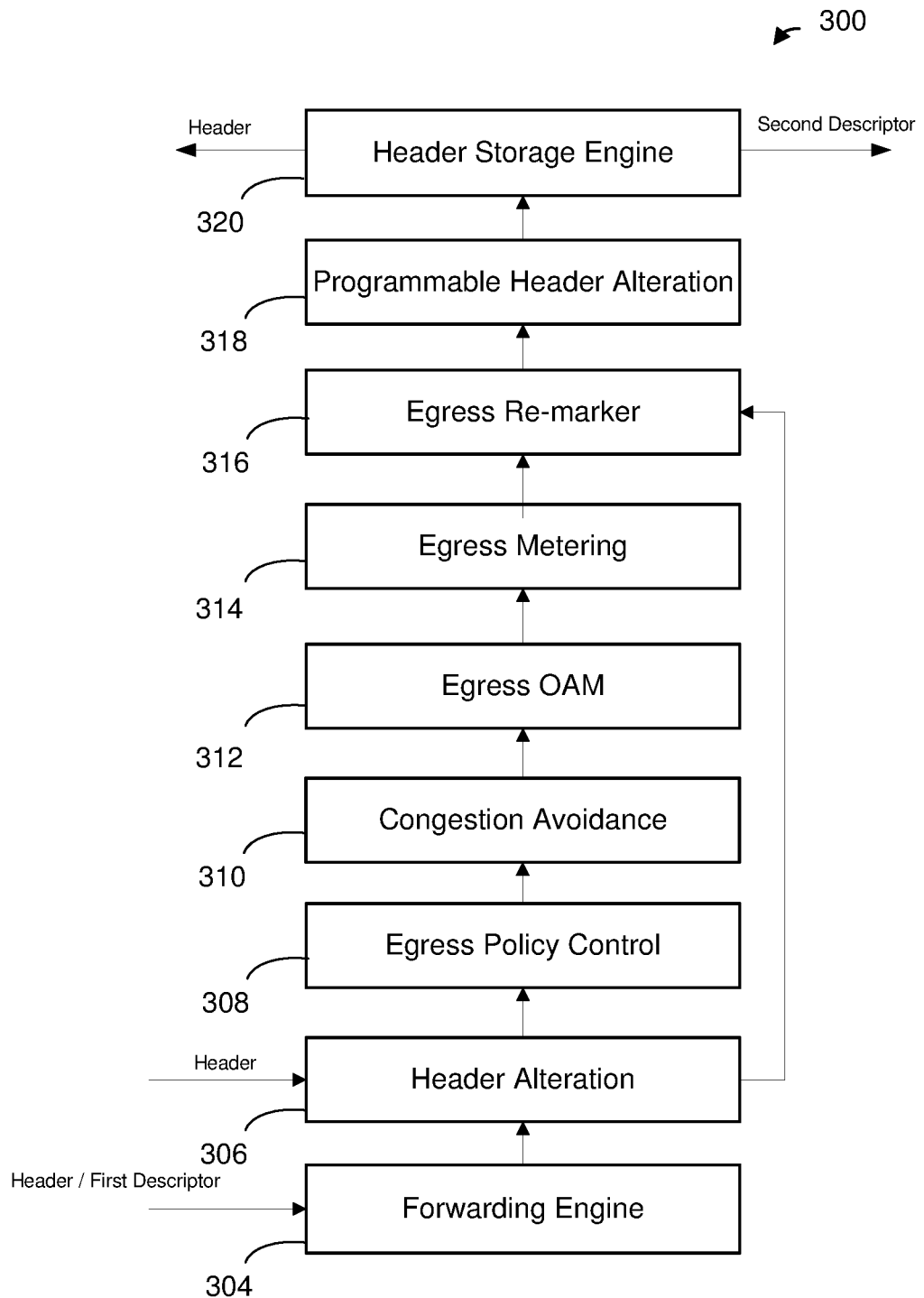
FIG. 3 is a block diagram of an example processing pipeline included in the network device of FIG. 1, according to an embodiment.

FIG. 3 is a block diagram of a processing pipeline 300 included in a packet processor, such as the packet processor 126 of the network device 100 of FIG. 1, according to an embodiment. For ease of explanation, the processing pipeline 300 is described with reference to the network device 100 of FIG. 1. However, the processing pipeline 300 is configured to be used with network devices different from the network device 100 of FIG. 1, in some embodiments. Similarly, the network device 100, in some embodiments, is configured to employ a processing pipeline different from the pipeline 300, or to employ a processing architecture different from a processing pipeline (e.g., parallel processing architecture), in some embodiments.

In an embodiment, a packet is received by the network device 100, and a first portion (e.g., a payload) of the packet is stored in the packet memory 110. A second portion (e.g., a header) of the packet is provided to the processing pipeline 300 for processing of the packet. In an embodiment, a first packet descriptor associated with the packet, such as the first packet descriptor 200 of FIG. 2A, is generated to include the second portion of the packet, and the first packet descriptor is provided to the processing pipeline 300 for processing of the packet. The processing pipeline 300 processes the packet using header information, in an embodiment. For example, the processing pipeline 300 processes the packet based on header information included in the first packet descriptor associated with the packet, in an embodiment.

The processing pipeline 300 includes a forwarding engine 304, a header alteration engine 306, an egress policy control engine 308, a congestion avoidance engine 310, an egress Operations, Administration, and Maintenance (OAM) engine 312, an egress metering engine 314, an egress re-marker engine 316, a programmable header alteration engine 318, and a header storage engine 320, in an embodiment. The forwarding engine 304 is configured to determine a port or ports 104 to which the packet is to be forwarded, in embodiment. The forwarding engine 304 corresponds to the forwarding engine 128 of FIG. 1, in an embodiment. The forwarding engine 304 includes, or is coupled to, a forwarding database (not shown) that stores forwarding information (e.g., port information) associated with addresses (e.g., MAC addresses, IP addresses, etc.) and/or other suitable information, in an embodiment. In an embodiment, the forwarding engine 304 is configured to utilize information from the header of the packet to look up information in the forwarding database that indicates the port or ports 104 to which the packet is to be forwarded. The forwarding engine 304 updates the first packet descriptor associated with the packet to include an indicator or indicators of the port or ports to which the packet is to be forwarded, in an embodiment. Although the pipeline 300 is illustrated in FIG. 3 as including only one forwarding engine 304, the pipeline 300 includes multiple forwarding engines 304, in some embodiments The header alteration engine 306 is coupled to the forwarding engine 304, in an embodiment. The header alteration engine 306 is configured to modify the second portion (e.g., the header) of the packet, if such modification is needed, in an embodiment. For example, the header alteration engine 306 modifies the header of the packet based on a processing result for the packet, in at least some situations, in an embodiment. In some embodiments, the processing pipeline 300 determines whether to and/or how to modify the header of the packet, and the header alteration engine 306 performs header alteration, if needed, as determined by the processing pipeline 300, in an embodiment. In some scenarios, the header alteration engine 306 modifies the header of the packet e.g., to change a next hop address, to add an encapsulating header, to remove an encapsulating header, etc.

The egress policy control engine 308 is coupled to the header alteration engine 306, in an embodiment. The egress policy control engine 308 is configured to further process the packet based on a (modified or unmodified) second portion of the packet. For example, the egress policy control engine 308 determines an egress flow to which the packet belongs, in an embodiment. The egress policy engine 308 updates the first packet descriptor associated with the packet to include an indicator of the egress flow of the packet, in an embodiment. As another example, the egress policy control engine 308 applies one or more ACL rules to the packet based on information included in the (modified or unmodified) second portion of the packet, in an embodiment.

The congestion avoidance engine 310 is configured to implement congestion avoidance, for example to control flow of packets to the transmit queues 134 so as to avoid overflow of the transmit queues 134, in an embodiment. The OAM engine 312 is configured to process OAM packets, for example to monitor or control the health of a network in which the network device 100 operates. The egress metering engine 314 is configured to account for the packet, for example by incrementing one or more counters associated with a port 104 that is to transmit the packet as determined by the forwarding engine 304, in an embodiment. The egress re-marker engine 316 is configured to apply remarks to a QoS field in the second portion (e.g., the header) of the packet, in an embodiment. The programmable header alteration engine 318 is configured to perform additional modification of the second portion (e.g., the header) of the packet. For example, the programmable header alteration engine 318 is configured to execute one or more header alteration operations that are configurable by an operator of the network device 100, in an embodiment. The programmable header alteration engine 318 allows for flexibility in header alteration, when needed, in an embodiment. A header storage engine 320 is configured to store the (modified or unmodified) second portion of the packet in the packet memory 110, in an embodiment. Additionally, the header storage engine 320 is configured to generate a second packet descriptor, such as the second packet descriptor 250 of FIG. 2B, associated with the packet, and provide the second packet descriptor to an appropriate transmit queue or queues 134 to enqueue the packet for subsequent transmission of the packet via the port or ports 104 determined by the forwarding engine 304, in an embodiment.

Figure 4:
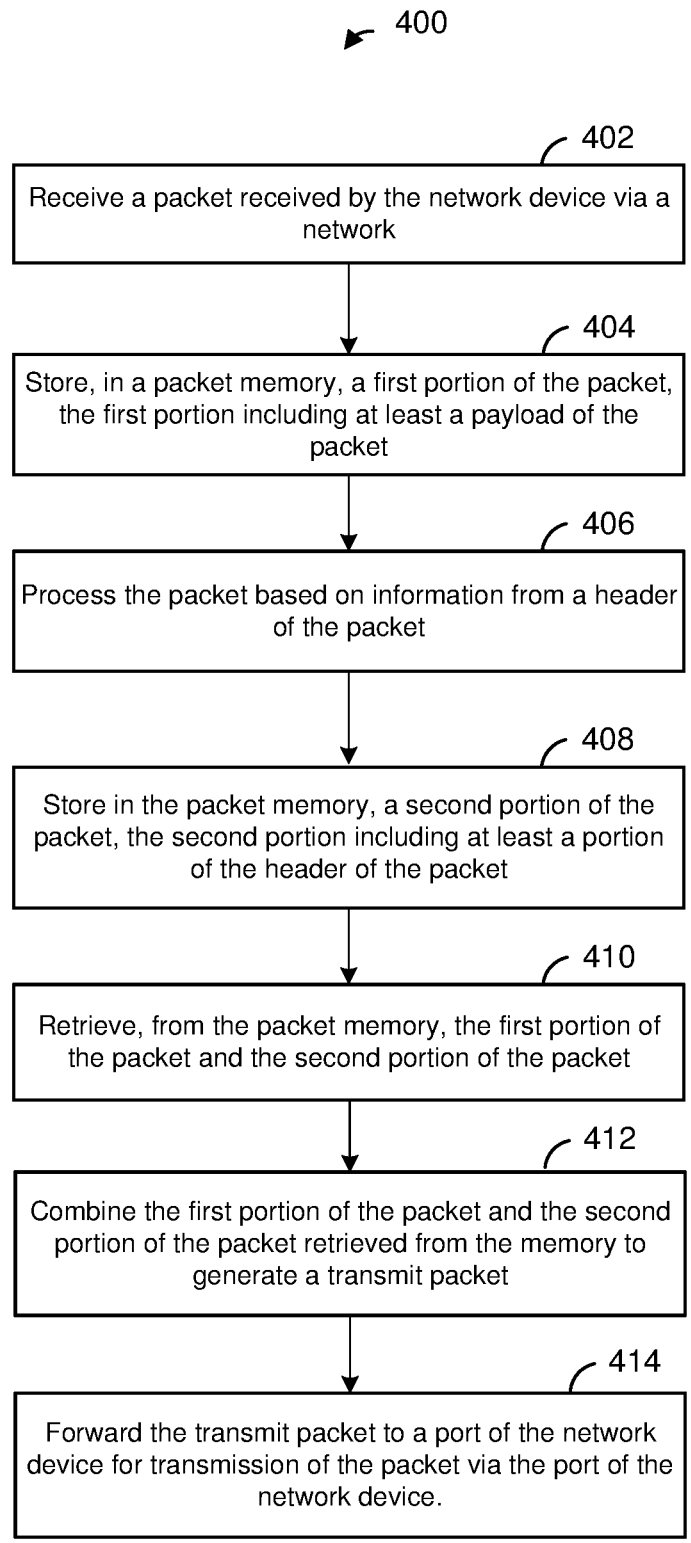
FIG. 4 is a flow diagram of an example method for processing packets in a network device, according to an embodiment.

FIG. 4 is a flow diagram illustrating an example method 400 for processing packets in a network device, according to an embodiment. In an embodiment, the network device 100 implements the method 400 to process a packet received by the network device 100. Thus, the method 400 is described with reference to the network device 100 merely for explanatory purposes. In other embodiments, the method 400 is implemented by another suitable network device.

At a block 402, a packet received via a port of a network device is received by a receive processor of the network device. In an embodiment, the packet 120 of FIG. 1 is received by the receive processor 108 of the network device 100. In another embodiment, a suitable packet different than the packet 120 is received and/or a packet is received by a suitable receive processor different from the receive processor 108 of the network device 100 of FIG. 1.

At block 404, a first portion of the packet is stored in a packet memory. In an embodiment, the first portion of the packet is stored in the packet memory 110 of the network device 100 of FIG. 1. In another embodiment, the first portion of the packet is stored in a packet memory different from the packet memory 110 of the network device 100 of FIG. 1. In an embodiment, the first portion of the packet includes a payload of the packet. In an embodiment, the first portion of the packet omits at least a portion of a header of the packet.

At block 406, the packet is processed based on information from a header of the packet. In an embodiment, the packet is processed by a packet processor of the network device. In an embodiment, the packet is processed by the packet processor 126 of the network device 100 of FIG. 1 and/or by the processing pipeline 300 of FIG. 3. In other embodiments, the packet is processed by a packet processor different from the packet processor 126 of the network device 100 of FIG. 1 and/or by a processing architecture different from the processing pipeline 300 of FIG. 3. In an embodiment, processing of the packet includes determining port or ports to which the packet is to be forwarded. In an embodiment, processing of the packet additionally includes determining whether and how a header of the packet is to be modified and, if necessary, performing header alteration to modify the header of the packet.

At block 408, a second portion is stored in the packet memory in which the first portion of the packet was stored at block 404. In an embodiment, the second portion of the packet includes at least a portion of the header of the packet. Storing the second portion of the packet in the packet memory at block 408 is performed after at least a portion of processing of the packet is performed at block 406, in an embodiment. For example, header alteration is performed, if needed, to modify the at least the portion of the header of the packet at block 406 prior to the second portion of the packet being stored in the packet memory at block 408. In this embodiment, if header alteration is performed prior to the second portion of the packet being stored in the packet memory, the then second portion of the packet stored in the packet memory includes the modified at least the portion of the header of the packet.

In an embodiment, the first portion of the packet is stored at block 404 in a first memory location in the packet memory, and the second portion of the packet is stored at block 408 in a second memory location in the packet memory. In an embodiment, the second memory location at which the second portion of the packet is stored at block 408 is separate from and independent of the first memory location at which the first portion of the packet is stored in the packet memory at block 404. In another embodiment, the second memory location at which the second portion of the packet is stored at block 408 depends on and/or is determined based on the first memory location at which the first portion of the packet is stored in the packet memory at block 404.

The first portion of the packet stored in the packet memory at block 404 and the second portion of the packet stored in the packet memory at block 408 are retrieved from the packet memory at block 410. In an embodiment, upon completion of processing of the packet at block 406, the packet (or a second packet descriptor associated with the packet) is enqueued in a transmit queue corresponding to a port 104 to which the packet is to be forwarded. Block 410 is then performed after the packet is dequeued from the transmit queue and is scheduled for transmission via the port 104. At block 412, the first portion of the packet and the second portion of the packet retrieved from the packet memory are combined to generate a transmit packet. At block 414, the transmit packet generated at block 412 is forwarded to a port of the network device for transmission of the transmit packet via the port of the network device.

FIG. 5 is a flow diagram illustrating an example method 500 for processing packets in a network device, according to an embodiment. In an embodiment, the network device 100 implements the method 500 to process a packet received by the network device 100. Thus, the method 500 is described with reference to the network device 100 merely for explanatory purposes. In other embodiments, the method 500 is implemented by another suitable network device.

At a block 502, a packet received via a port of a network device is received by a receive processor of the network device. In an embodiment, the packet 120 of FIG. 1 is received by the receive processor 108 of the network device 100. In another embodiment, a suitable packet different than the packet 120 is received and/or a packet is received by a suitable receive processor different from the receive processor 108 of the network device 100 of FIG. 1.

At block 504, at least a payload of the packet is stored in a packet memory. In an embodiment, storing the at least the payload in the packet memory comprises storing the at least the payload at a first location in the packet memory. In an embodiment, the at least the payload of the packet is stored in the packet memory 110 of the network device 100 of FIG. 1. In another embodiment, the at least the payload of the packet is stored in a packet memory different from the packet memory 110 of the network device 100 of FIG. 1.

At block 506, the packet is processed based on information from a header of the packet. In an embodiment, the packet is processed by a packet processor of the network device. In an embodiment, the packet is processed by the packet processor 126 of the network device 100 of FIG. 1 and/or by the processing pipeline 300 of FIG. 3. In other embodiments, the packet is processed by a packet processor different from the packet processor 126 of the network device 100 of FIG. 1 and/or by a processing architecture different from the processing pipeline 300 of FIG. 3. In an embodiment, processing of the packet includes determining port or ports to which the packet is to be forwarded. In an embodiment, processing of the packet additionally includes determining how a header of the packet is to be modified and, modifying the header to generate a modified header. In an embodiment, the modified header 132 of FIG. 1 is generated. In another embodiment, a suitable modified header different from the modified header 132 of FIG. 1 is generated.

At block 508, the modified header is stored in the packet memory. In an embodiment, storing the modified header in the packet memory comprises storing the modified header at a second location in the packet memory.

At block 510, a packet descriptor associated with the packet is enqueued in a transmit queue. In an embodiment, the packet descriptor enqueued in the transmit queue is a lean packet descriptor that omits at least some of the information based on which the header was modified at block 506. In an embodiment, the packet descriptor enqueued in the transmit queue at block 510 is the second packet descriptor 250 of FIG. 2B. In another embodiment, the packet descriptor enqueued in the transmit queue at block 510 is a data structure different from the second packet descriptor 250 of FIG. 2B.

At block 512, the modified header of the packet and the at least the payload of the packet are retrieved from the packet memory. In an embodiment, block 512 is performed when the packet is scheduled for transmission and the packet descriptor is dequeued from the transmit queue. In an embodiment, the modified header of the packet and the at least the payload of the packet are retrieved from the packet memory using indications, in the packet descriptor, of the second memory location at which the modified header is stored in the packet memory and first memory location at which the at least the payload is stored in the packet memory.

At block 514, the modified header and the at least the payload retired from the packet memory at block 512 are combined to generate a transmit packet. In an embodiment, the transmit packet 142 of FIG. 1 is generated. In another embodiment, a suitable transmit packet different from the transmit packet 142 of FIG. 1 is generated. At block 414, the transmit packet generated at block 412 is forwarded to a port of the network device for transmission of the transmit packet via the port of the network device.

In an embodiment, a method for processing packets in a network device includes receiving, at a receive processor of the network device, a packet received by the network device via a network. The method also includes storing, with the receive processor in a packet memory, a first portion of the packet, the first portion including at least a payload of the packet. The method further includes processing, with a packet processor of the network device, the packet based on information from a header of the packet. The method additionally includes after processing the packet, storing, with the packet processor in the packet memory, a second portion of the packet, the second portion including at least a portion of the header of the packet. The method further still includes, when the packet is to be transmitted, retrieving, with a transmit processor of the network device from the packet memory, the first portion of the packet and the second portion of the packet, and combining, with the transmit processor, the first portion of the packet and the second portion of the packet retrieved from the packet memory to generate a transmit packet. The method also includes forwarding, with the transmit processor, the transmit packet to a port of the network device for transmission of the transmit packet via port of the network device.

In other embodiments, the method also includes one of, or any suitable combination of two or more of, the following features.

The method further comprises, prior to storing the second portion of the packet, modifying, based on a result of processing of the packet, the header of the packet to generate a modified header, wherein storing the second portion of the packet comprises storing at least the modified header in the packet memory.

Modifying the header of the packet to generate the modified header includes modifying the header using one or more configurable header alteration operations.

Storing, in the packet memory, the first portion of the packet comprises storing the first portion of the packet at a first memory location in the packet memory.

Storing, in the packet memory, the second portion of the packet comprises storing the second portion at a second memory location in the packet memory, the second memory location being separate from the first memory location.

Retrieving, from the packet memory, the first portion of the packet and the second portion of the packet comprises retrieving the first portion of the packet from the first memory location in the packet memory using information that indicates the first memory location in the packet memory, and retrieving the second portion of the packet from the second memory location in the packet memory using information that indicates the second memory location in the packet memory.

Processing the packet includes processing the packet using a first packet descriptor associated with the packet, wherein the first packet descriptor includes the information from the header of the packet, and wherein the method further comprises, after storing the second portion of the packet, generating a second packet descriptor associated with the packet, the second packet descriptor omitting at least some of the information from the header of the packet.

Generating the second packet descriptor includes generating the second packet descriptor to include memory location information that links the first portion of the packet in the packet memory and the second portion of the packet in the packet memory.

Retrieving, from the packet memory, the first portion of the packet and the second portion of the packet comprising retrieving the first portion of the packet and the second portion of the packet using the memory location information.

Generating the second packet descriptor to include the memory location information comprises generating the second packet descriptor to include first information that indicates a first memory location at which the first portion of the packet is stored in the packet memory and second information that indicates a second memory location at which the second portion is stored in the packet memory.

Generating the second packet descriptor comprises generating the second packet descriptor that is shorter than the first packet descriptor.

The method further comprises enqueueing the second packet descriptor in a transmit queue for subsequent transmission of the packet.

The method further comprises receiving the first packet descriptor at the packet processor via a first communication bus, and wherein enqueueing the second packet descriptor in the transmit queue includes providing the second packet descriptor to the transmit queue via a second communication bus that is narrower than the first communication bus.

In another embodiment, a network device comprises a receive processor configured to receive a packet that was received via a network link and store, in a packet memory, a first portion of the packet, the first portion including at least a payload of the packet. The network device also comprises a packet processor configured to process the packet based on information from a header of the packet, and, after processing the packet, store, in the packet memory, a second portion of the packet, the second portion including at least a portion of the header of the packet. The network device additionally comprises a transmit processor configured to, when the packet is to be transmitted, retrieving, with a transmit processor of the network device from the packet memory, the first portion of the packet and the second portion of the packet, combine the first portion of the packet and the second portion of the packet retrieved from the memory to generate a transmit packet, and forward the transmit packet to a port of the network device for transmission of the transmit packet via the port of the network device.

In other embodiments, the network device also comprises one of, or any suitable combination of two or more of, the following features.

The packet processor is further configured to, prior to storing the second portion of the packet, modify, based on a result of processing of the packet, the header of the packet to generate a modified header, wherein storing the second portion of the packet comprises storing at least the modified header in the packet memory.

The packet processor includes a programmable header alteration engine configured to execute one or more configurable header alteration operations as part of modifying the header of the packet to generate the modified header.

The receive processor is configured to store the first portion of the packet at a first memory location in the packet memory.

The packet processor is configured to store the second portion of the packet at a second memory location in the packet memory, the second memory location being separate from the first memory location.

The transmit processor is configured to retrieve the first portion of the packet from the first memory location in the packet memory using information that indicates the first memory location in the packet memory, and retrieve the second portion of the packet from the second memory location in the packet memory using information that indicates the second memory location in the packet memory.

The packet processor is configured to process the packet using a first packet descriptor associated with the packet, wherein the first packet descriptor includes the information from the header of the packet, and after storing the second portion of the packet, generate a second packet descriptor, the second packet descriptor omitting at least some of the information from the header of the packet.

The packet processor is configured to generate the second packet descriptor to include memory location information that links the first portion of the packet in the packet memory and the second portion of the packet in the packet memory.

The transmit processor is configured to receive the second packet descriptor, and retrieve, from the packet memory, the first portion of the packet and the second portion of the packet comprising using the memory location information included in the second packet descriptor.

The packet processor is configured to generate the second packet descriptor to include the memory location information by generating the second packet descriptor to include first information that indicates a first memory location at which the first portion of the packet is stored in the packet memory and second information that indicates a second memory location at which the second portion is stored in the packet memory.

The packet processor is configured to generate the second packet to be shorter than the first packet descriptor.

The packet processor is further configured to enqueue the second packet descriptor in a transmit queue for subsequent transmission of the packet via a corresponding port of the network device.

The network device further comprises a first communication bus configured to provide the first packet descriptor to the packet processor, and a second communication bus configured to provide the second packet descriptor to the transmit queue, wherein the second communication bus is narrower than the first communication bus.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for processing packets in a network device, the method comprising:
   receiving, at the network device, a packet from a network;
   storing, with the network device, at least a payload of the packet in one or more memories of the network device;
   generating, with the network device, a first packet descriptor corresponding to the packet, the first packet descriptor including information to be used by the network device for processing of the packet;
   processing, with a packet processor of the network device, the packet based on the first packet descriptor, the processing including at least i) determining at least one egress port via which to transmit the packet from the network device, ii) modifying a header of the packet to generate a modified header of the packet and iii) storing the modified header of the packet in the one or more memories of the network device;
   after processing the packet based on the first packet descriptor, generating, with the packet processor, a second packet descriptor to include linking information that links the at least the payload of the packet stored in the one or more memories and the modified header of the packet stored in the one or more memories;
   transferring, with the packet processor, the second packet descriptor to the at least one egress port determined based on the first packet descriptor;
   retrieving, based on the linking information in the second packet descriptor, the at least the payload of the packet and the modified header of the packet from the one or more memories,
   combining the at least the payload of the packet and the modified header of the packet to generate a transmit packet, and
   transmitting the transmit packet from the network device via the at least one egress port.

2. The method of claim 1, wherein
   storing the at least the payload of the packet in the one or more memories of the network device comprises storing the at least the payload of the packet in a packet memory of the network device, and
   storing the modified header of the packet in the one or more memories of the network device comprises storing the modified header of the packet in the packet memory of the network device.

3. The method of claim 2, wherein
   storing the at least the payload of the packet in the packet memory comprises storing the at least the payload of the packet at a first memory location in the packet memory, and
   storing the modified header of the packet in the packet memory comprises storing the modified header of the packet at a second memory location, separate from the first memory location, in the packet memory.

4. The method of claim 3, wherein generating the second packet descriptor to include the linking information that links the at least the payload of the packet and the modified header of the packet comprises generating the second packet descriptor to include first information that indicates the first memory location at which the at least the payload of the packet is stored in the packet memory and second information that indicates the second memory location at which the modified header of the packet is stored in the packet memory.

5. The method of claim 1, wherein generating the second packet descriptor comprises generating a lean packet descriptor that is smaller than the first packet descriptor.

6. The method of claim 1, wherein
   generating the first packet descriptor comprises generating the first packet descriptor to include a first number of bits, and
   generating the second packet descriptor comprises generating the second packet descriptor to include a second number of bits, the second number of bits being smaller than the first number of bits.

7. The method of claim 1, wherein
   the method further comprises receiving the first packet descriptor at the packet processor via a first communication bus, and
   transferring the second packet descriptor to the at least one egress port comprises transferring the second packet descriptor via a second communication bus, wherein the second communication bus is narrower than the first communication bus.

8. The method of claim 1, further comprising, after generating the second packet descriptor, discarding the first packet descriptor.

9. The method of claim 1, wherein modifying the header of the packet includes performing one or more header alteration operations using a header alteration engine configured to execute computer readable instructions stored in the one or more memories of the network device.

10. The method of claim 1, wherein modifying the header of the packet includes
    performing, with a first header alteration engine of the packet processor, one or more header alteration operations as part of modifying the header of the packet to generate the modified header, and
    performing, with a second header alteration engine configured to execute computer readable instructions stored in the one or more memories of the network device, one or more additional header alteration operations as part of modifying the header of the packet to generate the modified header.

11. A network device, comprising:
    a receive processor configured to
      receive a packet that was received by the network device via a network link,
      store at least a payload of the packet in one or more memories of the network device, and
      generate a first packet descriptor corresponding to the packet, the first packet descriptor including information to be used by the network device for processing of the packet;
    a packet processor configured to
      process the packet based on the first packet descriptor, the packet processor being configured to at least i) determine at least one egress port via which to transmit the packet from the network device, ii) modify a header of the packet to generate a modified header of the packet and iii) store the modified header of the packet in the one or more memories of the network device, and after processing the packet based on the first packet descriptor, generate a second packet descriptor to include linking information that links the at least the payload of the packet stored in the one or more memories and the modified header of the packet stored in the one or more memories, and transfer the second packet descriptor to the at least one egress port determined based on the first packet descriptor; and a transmit processor configured to retrieve, based on the linking information in the second packet descriptor, the at least the payload of the packet and the modified header of the packet from the one or more memories, combine the at least the payload of the packet and the modified header of the packet to generate a transmit packet, and transmit the transmit packet via the at least one egress port.

12. The network device of claim 11, wherein the receive processor is configured to store the at least the payload of the packet in a packet memory of the network device, and the packet processor is configured to store the modified header of the packet in the packet memory of the network device.

13. The network device of claim 12, wherein the receive processor is configured to store the at least the payload of the packet at a first memory location in the packet memory, and the packet processor is configured to store the modified header of the packet at a second memory location, separate from the first memory location, in the packet memory.

14. The network device of claim 13, wherein the packet processor is configured to generate the second packet descriptor to include the linking information at least by generating the second packet descriptor to include first information that indicates the first memory location at which the at least the payload of the packet is stored in the packet memory and second information that indicates the second memory location at which the modified header of the packet is stored in the packet memory.

15. The network device of claim 11, wherein the packet processor is configured to generate the second packet descriptor by generating a lean packet descriptor that is smaller than the first packet descriptor.

16. The network device of claim 11, wherein the packet processor is configured to generate the first packet descriptor to include a first number of bits, and generate the second packet descriptor to include a second number of bits, the second number of bits being smaller than the first number of bits.

17. The network device of claim 11, further comprising a first communication bus configured to provide the first packet descriptor to the packet processor, and a second communication bus configured to transfer the second packet descriptor to the at least one egress port, wherein the second communication bus is narrower than the first communication bus.

18. The network device of claim 11, wherein the packet processor is configured to, after generating the second packet descriptor, discard the first packet descriptor.

19. The network device of claim 11, wherein the packet processor includes a programmable header alteration engine configured to execute computer readable instructions stored in the one or more memories of the network device to perform one or more header alteration operations.

20. The network device of claim 11, wherein the packet processor includes a first header alteration engine configured to perform one or more header alteration operations as part of modifying the header of the packet to generate the modified header, and a second header alteration engine configured to execute computer readable instructions stored in the one or more memories of the network device to perform one or more additional header alteration operations as part of modifying the header of the packet to generate the modified header.

* * * * *